United States Patent [19]

Yasui et al.

[11] 4,094,836

[45] June 13, 1978

[54] AQUEOUS ALKYD RESINS

[75] Inventors: Seimei Yasui, Ibaraki; Minoru Hino; Kazuya Hayashi, both of Toyonaka, all of Japan

[73] Assignee: Sumitomo Chemical Company, Limited, Osaka, Japan

[21] Appl. No.: 785,699

[22] Filed: Apr. 7, 1977

Related U.S. Application Data

[63] Continuation-in-part of Ser. No. 670,957, Mar. 26, 1976, abandoned.

[30] Foreign Application Priority Data

Mar. 26, 1975 Japan .................................. 50-37260

[51] Int. Cl.$^2$ .......................... C09D 3/52; C09D 3/66; C09D 5/02
[52] U.S. Cl. .................... 260/22 CB; 260/21; 260/22 CQ; 260/23 P; 260/23.7 R; 260/23.7 A; 260/29.2 E; 260/29.2 UA
[58] Field of Search ............... 260/22 CB, 21, 29.2 E, 260/29.2 UA, 23.7 R, 23.7 A, 23 P, 22 CQ

[56] References Cited

U.S. PATENT DOCUMENTS

| 3,297,785 | 1/1967 | George | 260/23.7 R |
|---|---|---|---|
| 3,440,192 | 4/1969 | Hoy et al. | 260/23.7 R |
| 3,457,207 | 7/1969 | Gorke et al. | 260/22 CB |
| 3,689,446 | 9/1972 | Furuya et al. | 260/23.7 A |
| 3,705,866 | 12/1972 | Shibata et al. | 260/23.7 A |
| 3,876,721 | 4/1975 | Yasui et al. | 260/680 B |
| 3,925,279 | 12/1975 | Horii et al. | 260/23.7 R |
| 3,944,512 | 3/1976 | Broecker et al. | 260/23.7 R |
| 3,959,198 | 5/1976 | Broecker et al. | 260/23.7 R |

*Primary Examiner*—Ronald W. Griffin
*Attorney, Agent, or Firm*—Birch, Stewart, Kolasch and Birch

[57] ABSTRACT

An aqueous alkyd resin obtained by the neutralization of a polycondensation resin with a base, the polycondensation resin being prepared by reacting a reaction mixture obtained by the transesterification or esterification of (a) a natural fat and oil or a fatty acid with a polyhydric alcohol with an adduct of (b) a liquid polybutadiene having a number average molecular weight of 150 to 900, a viscosity of 2 to 80 cps. at 30° C and at least 50% of the cis-1,4 structure with an $\alpha,\beta$-unsaturated dicarboxylic acid or the anhydride thereof, and/or the half-ester of said adduct, and with (c) an aromatic polycarboxylic acid or the anhydride thereof, and the polycondensation resin having free carboxyl groups in the amount corresponding to an acid value of 30 to 70 and containing 5 to 50% by weight of the component (b). This alkyd shows excellent coating film properties when used for water-base paints, printing inks and the like.

14 Claims, No Drawings

AQUEOUS ALKYD RESINS

This application is a continuation-in-part application of U.S. Ser. No. 670,957 filed on Mar. 26, 1976, now abandoned.

The present invention relates to an aqueous alkyd resin. More particularly, it relates to an aqueous alkyd resin obtained by the neutralization of a polycondensation resin with a base, the polycondensation resin being prepared by reacting a reaction mixture obtained by the transesterification or esterification of (a) a natural fat and oil or a fatty acid with a polyhydric alcohol, with an adduct of (b) a liquid polybutadiene having a number average molecular weight of 150 to 900, a viscosity of 2 to 80 cps. at 30° C and at least 50% of the cis-1,4 structure with an $\alpha,\beta$-unsaturated dicarboxylic acid or the anhydride thereof, and/or the half-ester of said adduct, and with (c) an aromatic polycarboxylic acid or the anhydride thereof, and the polycondensation resin having free carboxyl groups in the amount corresponding to an acid value of 30 to 70 and containing 5 to 50% by weight of the above component (b).

The aqueous alkyd resins of the present invention can form a coating film having excellent gloss, water resistance and hydrolysis resistance when used for water-base paints, printing inks and the like.

Hitherto, it is well known that the resins useful for water-base paints are produced from natural fats and oils (e.g. non-drying oils, semidrying oils and drying oils) or fatty acids derived therefrom by reacting them with polycarboxylic acids and polyhydric alcohols so that some carboxyl groups thereof remain free in the resulting resins and neutralizing the remaining carboxyl groups with amines or alkali hydroxides to give the salts of the resins. These resins thus obtained are now in a practical use.

However, these conventional water-base paint compositions are not always satisfactory in terms of gloss, hardness, water resistance and alkaline hydrolysis resistance of the dry coating film. In practical use, therefore, the resins ae properly modified so as to meet the object of the application. Further, the yield of the natural fats and oils used as the main material varied largely with the weather and the harvest, and therefore it is very difficult to supply them constantly and in a large amount.

Accordingly, the development of synthetic fats and oils having the properties equivalent to or superior to those of the natural fats and oils has strongly been desired.

In recent years, butadiene and the like have become abundant and readily available with the development in petrochemistry. As the result of extensive studies, the present inventors have succeeded in the synthesis of various liquid polymers having an optional molecular weight, in an industrially advantageous way. It is thought that this polymer will become very promising in future as a substitute for the natural drying oils.

Alkyd resins are conventionally prepared by heating, for example, a polycarboxylic anhydride (e.g. phthalic anhydride), a polyhydric alcohol (e.g. pentaerythritol and glycerin) and a monobasic acid (e.g. linseed oil fatty acid and soybean oil fatty acid) and thereby subjecting them to a dehydration-condensation, or, when the fatty acid is replaced by an oil which is a triglyceride of the fatty acid, by subjecting the oil to a transesterification reaction with the polyhydric alcohol and then subjecting the resultant product to dehydration-condensation with the polycarboxylic anhydride with heating.

On the other hand, Japaneses Patent Publication No. 1580/1975 (West German Offenlegungsschrift No. 1,815,014) discloses a method for the preparation of the water-base paint containing a liquid polybutadiene with a high content of the cis-1,4 structure. In this method, a blend of a reaction product of a natural drying oil with maleic anhydride and a reaction product of the liquid polybutadiene with maleic anhydride is used as a resin for the paint.

However, this type of paint has the following defects. The maleic products of the liquid polybutadiene having a high content of the cis-1,4 structure are very rapidly oxidized with air at the cis-1,4 double bonds thereof, and therefore the products harden very rapidly at the surface thereof, but on the other hand, the inner part thereof hardens fairly slowly since the products are extremely slow in the formation of crosslinkage between the double bonds. Consequently, the coating film of more than 30 $\mu$ in thickness, particularly more than 100 $\mu$, does not harden completely at the inner part, and shows very poor alkali resistance and hardness.

On the other hand, in case of an alkyd type resin, the maleic product of the liquid polybutadiene having a high content of the cis-1,4 structure is bonded to the resin and helps the resin to become a high polymer through the formation of ester linkages between the products and the natural oils. Furthermore, since the alkyd resin contains phthalic anhydride residues having a rigid molecule, it hardens rapidly at the inner part thereof and gives a coating film having a high degree of hardness.

Moreover, by controlling the amount of hydroxy groups in alkyd resin, the alkyd resin is blended with a melamine resin to form crosslinkage between both resins, which is very useful for improving the properties of the coating film, for example, hardness, water resistance and alkali resistance.

An object of the present invention is to provide an aqueous alkyd resin obtained by polycondensing an aromatic polycarboxylic acid or the anhydride thereof, a natural fat and oil or a fatty acid and a polyhydric alcohol wherein all or a part of the fatty acid or the fat and oil are replaced by an adduct of a liquid polybutadiene having the cis-1,4 structure with an $\alpha,\beta$-unsaturated dicarboxylic acid or the anhydride thereof, or the half-ester of said adduct, and neutralizing the resulting resin produced by the polycondensation reaction with a base.

Another object of the present invention is to provide an aqueous alkyd resin which gives excellent coating film properties when used in water-base paints, printing inks and the like. These and other objects of the invention will be apparent from the description hereinafter.

It was found by the inventors that the alkyd resin of the present invention is extremely superior, when used in water-base paints, printing inks and the like, to the conventional alkyd resins produced from the natural fats and oils or the fatty acids derived therefrom in coating film properties, for example, gloss, hardness, impact resistance, water resistance and alkaline hydrolysis resistance.

The adducts between the polybutadienes and $\alpha,\beta$-unsaturated dicarboxylic acids or the anhydrides thereof, and the half-esters of said adducts, which are used in the present invention, are characterized in that they have a lower viscosity than that of polybutadienes having a high content of the 1,2-structure or liquid polybutadienes prepared by the radical polymerization, because the polybutadienes of the present invention are mainly of a cis-structure. Therefore, they are easily handled in the course of the reaction for the preparation of the alkyd resins, and further they are easily subjected to the reaction without a solvent, the so-called fusion cooking.

Furthermore, they produce alkyd resins which dry more rapidly and form a more glossy coating film, when used in water-base paints, printing inks and the like, than the resins resulting from the polybutadienes having a high content of the 1,2-structure or the liquid polybutadienes prepared by the radical polymerization.

The conditions for the preparation of the present alkyd resins must be altered to some extent, depending upon the amount of the adduct between the polybutadiene and the acid or the anhydride thereof, or the amount of the half-ester of the adduct, and the type of the reaction, that is, the transesterification with the natural fats and oils or the direct reaction with the fatty acids.

One embodiment of the methods for the preparation thereof is as follows:

The transesterification reaction between the fats and oils (e.g. soybean oil) and glycerin or pentaerythritol is first carried out at 220° to 240° C in the presence of a suitable catalyst. To the reaction mixture are added phthalic anhydride and the adduct of the polybutadiene and the $\alpha,\beta$-unsaturated dicarboxylic acid or the anhydride thereof, or the half-ester of said adduct. The mixture is kept at 190° to 210° C to proceed with the dehydration-condensation thereof until the acid value of the product reaches 30 to 70. The acid value should be fixed in the range of 30 to 70 for the following reasons. When the acid value is less than 30, the product becomes difficulty water-soluble and causes the phase-separation of the resinous component when diluted with water, which means that this product is useless as a resin for water-base paints, and on the other hand, when the acid value is larger than 70, the alkali resistance of the resin becomes considerably poor. The acid value is preferably 40 to 55.

The salts of the present resins can be produced by diluting the reaction mixture with a water-soluble solvent such as butyl cellosolve, and thereafter neutralizing all or a part of the free carboxyl groups contained in the resins with a base, for example, an amine or an alkali metal hydroxide to give an aqueous solution or aqueous dispersion of the resins.

The $\alpha,\beta$-unsaturated dicarboxylic acids or he anhydrides thereof include, for example, maleic anhydride, maleic acid, fumaric acid, itaconic acid, citraconic acid and the like.

The liquid polybutadienes used in the present invention are composed of at least 50% of the cis-1,4 structure, 0.5 to 10% of the vinyl structure and the remaining percentage of the trans-1,4 structure. The number average molecular weight and the viscosity of the polybutadienes are 150 to 900 and 2 to 80 cps. at 30° C, respectively. These polybutadienes are prepared by the methods disclosed in Japanese Patent Laid Open Publication Nos. 43,084/1973, 26,396/1974 and 89,788/1974, but any other method may be usable. When the molecular weight of the liquid polybutadiene is larger than 900, the reaction mixture of the polycondensation reaction tends to gelate by using the adduct of the liquid polybutadienes and the $\alpha,\beta$-unsaturated dicarboxylic acids or the anhydrides thereof as one of the acid components of the polycondensation resin. On the other hand, when the molecular weight of the liquid polybutadiene is lower than 150, the vapor pressure of the liquid polymer is very high, and hence, the addition reaction of the liquid polybutadiene with $\alpha,\beta$-unsaturated dicarboxylic acids or anhydrides thereof hardly proceeds under normal pressure.

The adducts of the liquid polybutadienes and the $\alpha,\beta$-unsaturated dicarboxylic acids or the anhydrides thereof can easily be obtained by heating both at 150° to 250° C under the atmosphere of an inert gas without using any catalyst. The addition of the $\alpha,\beta$-unsaturated dicarboxylic acids or the anhydrides thereof with the liquid polybutadienes can completely be carried out.

The half-esters of the adducts of the liquid polybutadienes and the $\alpha,\beta$-unsaturated dicarboxylic acids or the anhydrides thereof can be obtained by reacting the adduct with an alcohol under the mild reaction conditions, that is, the adduct is reacted with an alcohol of about 1 to 10 times by mole based on the anhydride in the adduct at 50° to 250° C for 1 to 3 hours with or without a solvent.

The alcohols used for the half-esterification include aliphatic alcohols (e.g. methanol, ethanol, n-propanol, n-butanol, n-pentanol, n-octanol and 2-ethylhexanol); polyhydric alcohols (e.g. ethylene glycol, propylene glycol, glycerin and pentaerythritol); ether alcohols (e.g. methyl cellosolve, ethyl cellosolve and n-butyl cellosolve); aralkyl alcohols (e.g. benzyl alcohol and 2-phenylethyl alcohol); and the combinations thereof.

The content of the $\alpha,\beta$-unsaturated dicarboxylic acid or the anhydride thereof in the adducts is in the following range, for example, when maleic anhydride is used as the acid or the anhydride, the number of maleic anhydride molecules is 0.5 to 3, preferably 1 to 2, per polybutadiene molecule (as an average molecular weight).

Therefore, in the case of the liquid polybutadiene having an average molecular weight of 700, the desirable maleination ratio is from 12.3 to 24.6%.

When the number of maleic anhydride molecules is less than 0.5 per polybutadiene molecule (as an average molecular weight), the resulting alkyd resin contains a larger amount of the unreacted polybutadiene and becomes more difficulty water-soluble. Consequently the resin having desired properties can not be obtained. On the other hand, when maleic anhydride is used in excess, the number of functional groups can be decreased by the half-esterification, but gel-formation occurs during the polycondensation or the properties of the coating film become poor. Therefore, it is not desirable to introduce more than 3 molecules of maleic anhydride into the adduct.

The amount of the adduct of the polybutadiene and the $\alpha,\beta$-unsaturated dicarboxylic acid or the anhydride thereof, or the amount of the half-ester of said adduct is altered according to the object of application.

The liquid polybutadiene is used as a substitute for the natural fat an oil or the fatty acid in an amount of about 10 to 70% by weight, based on the total amount of the natural fat and oil or the fatty acid and the liquid polybutadiene.

The total amount of the adduct or the half-ester thereof and the natural fat and oil or the fatty acid is used in an amount of 30 to 85% by weight based on the whole resin. The suitable amount is optionally selected in this range depending upon the desired coating film properties.

The aromatic polycarboxylic acids and the anhydrides thereof include phthalic anhydride, phthalic acid, isophthalic acid, trimellitic acid, trimellitic anhydride, pyromellitic anhydride and the like. The polyhydric alcohols include glycerin, pentaerythritol, trimethylol propane, trimethylol ethane, ethylene glycol, diethylene glycol and the like.

The natural fats and oils used in combination with the maleic polybutadienes or the half-esters thereof include linseed oil, soybean oil, tung oil, dehydrated castor oil, safflower oil, coconut oil and the like. When fatty acids are used for the reaction, those derived from the natural fats and oils described above are used.

As the catalysts which are used in the transesterification of the polyhydric alcohols with the natural fats and oils, there are exemplified lead oxide, zinc oxide, potassium carbonate, calcium soap and the like.

As the solvents which are used as a diluent after the reaction for the preparation of the alkyd resins, there are exemplified an alcohol having 1 to 4 carbon atoms (e.g. methanol, ethanol, propanol and butanol), an ethylene glycol monoalkyl ether having 1 to 12 carbon atoms in the alkyl moiety (e.g. ethylene glycol monomethyl ether, ethylene glycol monohexyl ether, ethylene glycol monoheptyl ether, ethylene glycol monooctyl ether, ethylene glycol monodecyl ether, and ethylene glycol monododecyl ether), diethylene glycol monoalkyl ether having 1 to 12 carbon atoms in the alkyl moiety (e.g. diethylene glycol monomethyl ether, diethylene glycol monoethyl ether, diethylene glycol monobutyl ether, etc.), ethylene glycol, propylene glycol, diethylene glycol, dioxane, dimethylformamide and the like.

The modified alkyd resins of the present invention contain the free carboxyl groups in the amount corresponding to an acid value of 30 to 70, preferably 40 to 55.

When the acid value is less than 30, the resins are quite unsatisfactory in terms of solubilization or emulsification in water in the course of the preparation of water-base paints therefrom. On the other hand, when the acid value is larger than 70, the resins become poor in the coating film properties, particularly water resistance and alkali resistance.

In the aqueous alkyd resin of the present invention, the proportion of the component (b) to the component (a) may preferably be 0.1 to 0.7 by weight [calculated as (b)/(a) + (b)], and the proportion of the component (c) may preferably be 20 to 50% by weight based on the total amount of the components (a), (b) and (c).

The modified alkyd resins thus obtained are formulated in general into the paints of an aqueous solution type or an aqueous dispersion type by neutralizing all or part of the free carboxyl groups in the resins with a base. Alternatively the resins may be used as a component of the paint without neutralizing the free carboxyl groups, or may be emulsified with a surfactant.

As the bases which are used for the neutralization of the free carboxyl groups in the alkyd resins, there may be exemplified primary amines (e.g. methylamine, ethylamine, monoethanolamine and cyclohexylamine); secondary amines (e.g. dimethylamine, diethylamine, morpholine and diethanolamine); tertiary amines (e.g. trimethylamine, triethylamine, N-alkylmorpholine and triethanolamine); and inorganic bases (e.g. sodium hydroxide, potassium hydroxide and ammonia), and the like.

The amount of the basis neutralizing agents is preferably 0.3 to 1.2 equivalent to the carboxyl group.

The aqueous akyd resins thus obtained are diluted with a diluent such as water, by which the viscosity thereof is controlled as desired, and the resultant is milled together with additives such as a pigment in a ball mill or paint roller. The mill base thus obtained is then mixed with a drier and used for coating.

The aqueous akyd resins of the present invention can also be formulated into the paints of a baking type in combination with additives, for example, a curing agent such as a melamine resin. In this case, the preferred amount of the melamine resin is 10 to 50% by weight on the basis of the mixture of both resins.

The water-base paints which contain the present alkyd resins modified with the adducts of the polybutadiene and the $\alpha,\beta$-unsaturated dicarboxylic acid or the anhydride thereof, or the half-esters of the adducts, form a coating film having excellent properties when they are used in any of the baking type and the air-drying type.

The aqueous alkyd resins of the present invention are extremely excellent in the compatibility with any resin and the affinity to any pigment. Furthermore, they have an extremely high degree of water-solubility which can not be obtained with the conventional resins for water-base paints, and nevertheless they form a coating film which has excellent water resistance, chemical resistance, impact resistance and flexibility. Particularly, the coating film has higher degrees of hardness and gloss than expected.

The aqueous alkyd resins of the present invention may be emulsified with an emulsifier without neutralizing the free carboxyl groups and used for water-base paints. The resins may also be used as a component of oil-base paints.

The water-base paints containing the aqueous alkyd resins of the present invention can form a coating film by any of the conventional coating methods, such as brushing, spraying and the like, or can be used for electrodeposition coating of iron or aluminum.

The present invention will be illustrated with reference to the following examples, which are not however to be interpreted as limiting the invention thereto.

EXAMPLE 1

A 1,000 ml four-necked flask equipped with a stirrer, a thermometer, a condenser and a tube for blowing a nitrogen gas was charged with a soybean oil (189 g), glycerin (109 g) and lead oxide (0.11 g). The transesterification reaction was carried out by keeping the mixture at 230° C for 30 minutes under the atmosphere of nitrogen gas. After confirming that the reaction mixture was dissolved uniformly in methanol, the maleic polybutadiene (81 g) prepared by the method described hereinafter was added to the reaction mixture and the dehydration-condensation was carried out by keeping the mixture at 200° to 210° C for 1 hour. Thereafter, phthalic anhydride (209 g) and xylene (20 g) were added thereto, and the mixture was reacted at 200° to 210° C until the acid value of the reaction mixture reached 45.

The maleic polybutadiene was prepared by reacting maleic anhydride (34 g), with the liquid polybutadiene (viscosity: 70 cps. at 30° C, molecular weight measured by a vapor pressure osmometer: 880, iodine value (Wijs method): 462, cis-1,4 structure: 65%, trans-1,4 structure: 28% and vinyl structure: 7%, 166 g) at 190° C for 4 hours under the atmosphere of a nitrogen gas.

The reaction mixture having an acid value of 45 obtained above was diluted with butyl cellosolve (68 g) under cooling to obtain a viscous polycondensation product (viscosity: 70,000 cps. at 25° C, acid value: 39 and Gardner's color scalel: 6-7).

After the polycondensation product (39 g) was neutralized with triethylamine equivalent to the free carboxyl groups, water (34 g) was added thereto. Then, the product turned into an aqueous solution having a high degree of transparency which exhibited no change on standing for a long time. The aqueous solution was admixed with manganese naphthenate (0.2% as the metallic manganese based on the resin), stirred and further admixed with titanium white (33 g). The mixture was shaken on a paint conditioner to disperse the pigment to give a paint.

The paint thus obtained was applied onto a soft steel plate in a film thickness of 30 $\mu$ using a bar coater. At the same time, a reference paint was prepared by milling a mixture of a commercially available, aqueous dispersion type oil-modified alkyd resin, titanium white and manganese naphthenate in a paint shaker.

Both the paint containing the resin of the present invention and the reference paint reached the tack-free state within 30 minutes and therefore both paints had almost the same drying property. However, the half-drying time was less than 4 hours with the paint of the present invention, while it took as long as 7 hours with the reference paint. The drying time was less than 24 hours in either case.

The dry coating film containing the resin of the present invention had a high degree of gloss, the numerical value of which was 10 to 20% larger by a 60-degree gloss than that of the coating film of the reference paint. The pencil hardness of the film 7 days after application was H with the paint of the present invention, while it was HB to B with the reference paint. The impact resistance, adhesiveness and bendability were also good with the paint of the present invention.

The tack-free state refers to the state where a fingertip has no longer become dirty when it gives a slight touch to the center of the coated surface.

The half-drying time refers to the time required for the coated surface to dry to such a degree that no finger marks are left behind on the surface when the surface is rubbed by the finger at the center thereof.

The drying time refers to the timer required for the coated surface to dry to such a degree that no hollow is made on the surface or no motion of the surface is felt when the surface is strongly pressed at the center thereof between the forefinger and the thumb, and that no finger marks are left behind on the surface when the surface is rubbed rapidly and repeatedly by the finger at the center thereof.

The gloss was measured for the 60-degree specular reflectance on a glossmeter. The hardness of the coating film is indicated by the upper limit of pencil hardnes when the pencil (Mitsubishi Uni ®, a registered trade mark of Mitsubishi Pencil Co., Ltd.) can be moved forward on the surface at an angle of 45° thereto without giving any scratch to the surface.

REFERENCE EXAMPLE 1

This was carried out in the same manner as described in Example 1 except that the liquid polybutadiene used has a molecular weight different from that of the liquid polybutadiene used in Example 1.

The liquid polybutadiene used has a viscosity: 450 cps at 30° C, a number average molecular weight: 1700, the micro-structure of cis-1,4 structure: 75%, trans-1,4 structure: 24% and vinyl structure: 1%.

The maleic polybutadiene was prepared by reacting the above liquid polybutadiene (166 g) with maleic anhydride (34 g) at 190° C for 4 hours under an atmosphere of nitrogen gas.

In the same manner as described in Example 1, soybean oil and glycerin were subjected to the transesterification reaction, and thereto was added the above maleic polybutadiene, and the mixture was subjected to the dehydration-condensation reaction at 200° – 210° C. After adding phthalic anhydride to the mixture, the reaction was continued. As the result, the whole reaction mixture was gelated, and hence, the desired alkyd resin could not be obtained.

EXAMPLE 2

A 500 ml four-necked flask equipped with a stirrer, a thermometer, a condenser and a tube for blowing a nitrogen gas was charged with a soybean oil (90 g), pentaerythritol (27.6 g) and lead oxide (0.03 g). The transesterification was carried out by keeping the mixture at 230° for 30 minutes. Thereafter, the same maleic polybutadiene (42 g) as used in Example 1, phthalic anhydride (48.4 g) and xylene (20 g) were added thereto, and the mixture was reacted at 200° to 210° C until the acid value of the reaction mixture reached 46. The reaction mixture was diluted with butyl cellosolve (180 g) under cooling to obtain a polycondensation product (apparent concentration: 50%, acid value: 23.5 and solution viscosity: 750 cps. at 25° C).

The product was made water-soluble in the same manner as in Example 1 and then formulated into a paint using, as a drier, manganese naphthenate (0.01% as the metallic manganese based on the resulting resin).

This paint was applied onto a soft steel plate in a film thickness of 20 $\mu$ using a bar coater and baked at 150° C for 30 minutes. The coating film thus obtained had a high degree of gloss and a pencil hardness of 5H.

The coating film was immersed in water and in a 3% aqueous sodium chloride solution for 5 days, but no charge was observed on the surface in either case.

The coating film showed little or no change on the surface even when immersed in a 5% sodium hydroxide solution for 15 hours at room temperature.

EXAMPLE 3

Preparation of the half-ester of maleic polybutadiene:

The maleic product was obtained by reacting maleic anhydride (49 g) with the liquid polybutadiene (viscosity: 40 cps. at 30° C, molecular weight measured by a vapor pressure osmometer: 700, iodine value (Wijs method): 457, cis-1,4 structure: 69%, trans-1,4 structure: 27% and vinyl structure: 4%; 175 g) at 190° C for 4 hours under the atmosphere of a nitrogen gas. To the reaction mixture was added n-pentanol (220 g) and the mixture was reacted at 130° C for 2 hours. Thereafter, the excess of the n-pentanol was removed by distillation under reduced pressure to obtain the desired half-ester.

This product had an acid value of 106 and a saponification value of 101, which means that it is a half-ester.

Preparation of the alkyd resin

The same 1,000 ml four-necked flask as used in Example 1 was charged with a soybean oil (135 g), glycerin (105 g) and lead oxide (0.11 g) and the mixture was kept at 230° C for 30 minutes. It was confirmed that the transesterification proceeded during that time.

The reaction mixture was then admixed with the above half-ester of maleic polybutadiene (135 g) and reacted at 190° to 210° C for 1 hour. Thereafter, phthalic anhydride (209 g) and xylene (20 g) were further added thereto and the condensation thereof was carried out at 190° to 210° C until the acid value of the reaction mixture reached 50. The reaction mixture was diluted with butyl cellosolve (94 g) to obtain a polycondensation product (viscosity: 30,000 cps. at 25° C, acid value: 42 and Gardner's color scale: 5-6).

Evaluation of the paint

This polycondensation product was formulated into a water-base paint in the same manner as in Example 1 and was tested for the coating film properties.

As the result, the drying property of the coating film was such that the film reacted the tack-free state in 20 minutes, the half-drying state in 4 hours and 20 minutes and the complete dryness in 24 hours. The dry coating film 7 days after application was glossy and had a pencil hardness of H.

The impact resistance, adhesiveness and bendability were the same as those of the commercially available, aqueous dispersion type oil-modified alkyd resin which was evaluated for the comparison with the present resin.

REFERENCE EXAMPLE 2

This was carried out in the same manner as described in Example 3 of the present specification except that the liquid polybutadiene used has a molecular weight different from that of the liquid polybutadiene used in Example 3.

The liquid polybutadiene used has a viscosity: 450 cps at 30° C, a number average molecular weight: 1700, the micro-structure of cis-1,4 structure: 75%, trans-1,4 structure: 24% and vinyl structure: 1%.

The half-ester of maleic polybutadiene was prepared in the same manner as described in Example 3.

In the same manner as described in Example 3, soybean oil and glycerin were subjected to the transesterification reaction, and thereto were added the above half-ester of maleic polybutadiene and also phthalic anhydride. The mixture was subjected to the dehydration-condensation reaction at 190° – 210° C. However, the whole reaction mixture was gelated, and the desired resin could not be obtained.

As is made clear from the results in Reference Examples 1 and 2, when a liquid polybutadiene having a molecular weight of more than 1000 is used, the reaction mixture is easily gelated in the dehydration-condensation reaction step, but on the other hand, when a liquid polybutadiene having a molecular weight of less than 900 is used, no gelation of the reaction mixture occurs.

REFERENCE EXAMPLE 3

The alkyd resin was prepared as follows in the same equipment as used in Example 1, using the liquid polybutadiene having a 1,2-structure of 90% and a number average molecular weight of 1,000.

A 500 ml three-necked flask, the atmosphere of which was previously replaced by nitrogen gas, was charged with the above 1,2-structure type liquid polybutadiene (306 g) and maleic anhydride (34 g), and the mixture was reacted at 200° C for 5 hours.

Separately, a 1,000 ml four-necked flask was charged with a soybean oil (189 g), of glycerin (109 g) and lead oxide (0.11 g). After replacing the atmosphere in the flask by nitrogen gas, the transesterification was carried out at 230° C for 30 minutes. The maleic product of 1,2-structure type liquid polybutadiene prepared above was made less viscous by heating to 130° C and the product (136 g) was charged into the 1,000 ml flask.

The mixture was subjected to the dehydration-condensation at 200° to 210° C for 1 hour, and then admixed with phthalic anhydride (209 g) and xylene (20 g). The mixture was reacted at 200° to 210° C until the acid value of the reaction mixture reached 45. The reaction mixture was diluted with butyl cellosolve (68 g) under cooling to obtain a viscous polycondensation product. The product (42 g) was then neutralized with triethylamine equivalent to the free carboxyl groups of the product and dissolved in water (35 g). The aqueous solution thus obtained was formulated into a paint in the same manner as in Example 1 and applied onto a soft steel plate in a film thickness of 30 μ.

The drying property of the coating film was such that the film reached the tack-free state in 60 minutes, the half-drying state in 10 hours and the complete dryness in 38 hours. It is apparent from the results that the rate of drying was slower than that of the paint according to the present invention. The gloss was 65 by a 60-degree gloss which was lower than that of commercially available paints.

EXAMPLE 4

A 200 ml three-necked flask equipped with a stirrer was charged with maleic anhydride (21 g) and the liquid polybutadiene having a high content of the cis-1,4 structure (viscosity: 35 cps. at 30° C, number average molecular weight: 610, cis-1,4 structure: 65%, trans-1,4 structure: 30% and vinyl structure: 5%; 100 g). After replacing the atmosphere in the flask by nitrogen gas, the mixture was heated at 190° C for 4 hours, cooled to 50° C and maintained at this temperature.

Separately, a 200 ml three-necked flask, the atmosphere of which was previously replaced by nitrogen gas, was charged with glycerin (18.5 g), a soybean oil (32.1 g) and lead oxide (0.01 g). The transesterification was carried out at 230° C for 30 minutes. After cooling the reaction mixture to 180° C, the above maleic product of liquid polybutadiene (13.8 ) was added thereto and the mixture was stirred for 30 minutes. Thereafter, phthalic anhydride (35.5 g) was further added thereto and the mixture was reacted at 190° to 200° C for 2.5 hours and then cooled.

The alkyd resin thus obtained had an oil length of 45 and an acid value of 40. The resin solution was diluted with ethyl cellosolve so that the resin content became 85% by weight, by which the viscosity thereof was decreased. Next, the aqueous alkyd resin thus obtained and methoxymethyl melamine were mixed in the proportion of 85% by weight and 15% by weight, respectively. To the mixture (88 g) were added red iron oxide (16 g), ONCOR M-50 (produced by Shiraishi Calcium Co., Ltd., 8 g), Tc talc (produced by Tsuchiya Kaolin Co., Ltd., 10 g) and barytes (30 g). The mixture was thoroughly kneaded and formulated into a paint with addition of water (68 g).

The paint was applied onto two pieces of bright soft steel plate (150 mm × 70 mm × 0.8 mm, JIS G 314) by means of Bar coater #30 to prepare the test pieces, No. 1 and No. 2. For comparison, a reference paint was prepared in the same manner as described above by mixing a commercially available aqueous alkyd resin and methoxymethyl melamine in the proportion of 85:15 by weight.

Table 1 shows the physical properties of the coating film obtained by baking for 15 minutes at temperature of 110° C and 130° C. It is apparent from the results that the coating film of the present invention has excellent impact resistance, oil resistance, chemical resistance and salt spray resistance.

Table 1

| Sample | | No. 1 | No. 2 | Commercial product |
|---|---|---|---|---|
| Baking temperature (15 minutes) | | 110° C | 130° C | 130° C |
| Film thickness (μ) | | 25 – 27 | 26 – 27 | 25 – 27 |
| Gloss (%) | | 83 | 65 | 53 |
| Pencil hardness | | HB | HB | HB |
| Erichsen value (m/m)[1] | | 7.8 | 7.5 | 6.7 |
| Bendability[2] | | 2 m/m Good | 2 m/m Good | 2 m/m Good |
| Impact resistance (½ ")[3] | | 50 | 50 | 20 |
| | | 40 | 40 | 1 |
| Cross-cut test[4] | | 100/100 | 100/100 | 100/100 |
| Rubbing (xylene)[5] | | Good | Good | Poor (destroyed at 21th rubbing) |
| Oil resistance[6] | gasoline (24 hours) | HB | HB | B |
| Chemical[7] resistance | 5 % HCl | Good | Good | Slight loss in gloss |
| | 5 % H$_2$SO$_4$ | Good | Good | Slight loss in gloss |
| | 5 % NaCl | Good | Good | Good |
| | 1 % NaOH | Slight blistering | Slight blistering | Blistering |
| Salt spray[8] | | 2 | 1.5 | 2 |
| | | 3 | 2 | 4 |

[1]Erichsen test: The test piece is indented by pressing it at the back side with a steel rod of 20 mmφ in diameter, and the depth of the hollow formed when crackings have just appeared on the coated surface is measured.
[2]Bendability: JIS K 5400
[3]Impact resistance: Du Pont type impact tester
[4]Cross-cut test: JIS K 5400
[5]Rubbing (xylene): A forefinger is wound with gauze in five layers and the gauze is throughly soaked with xylene. The coated surface is rubbed with the gauze fifty times as strongly as possible.
[6]Oil resistance: The coating film is immersed in gasoline for 24 hours and is measured for the hardness.
[7]Chemical resistance: The coating film is immersed in the aqueous solution of the chemical for 24 hours and is visually judged for the film appearance.
[8]Salt spray test: JIS Z 2371

What is claimed is:

1. An aqueous alkyd resin obtained by the neutralization of a polycondensation resin with a base, the polycondensation resin being prepared by reacting a reaction mixture obtained by the transesterification or esterification of (a) a natural fat and oil or a fatty acid with a polyhydric alcohol with an adduct of (b) a liquid polybutadiene having a number average molecular weight of 150 to 900, a viscosity of 2 to 80 cps;. at 30° C and at least 50% of the cis-1,4 structure with an α,β-unsaturated dicarboxylic acid or the anhydride thereof, and/or the half-ester of said adduct, and (c) an aromatic polycarboxylic acid or the anhydride thereof, the proportion of the component (b) to the component (a) being in the range of 0.1 to 0.7 by weight, as calculated by (b)/(a) + (b), the polycondensation resin having free carboxyl groups in the amount corresponding to an acid value of 30 to 70 and containing 5 to 50% by weight of the component (b), wherein the total amount of the components (a) and (b) is in the range of 30 to 85% by weight on the basis of the whole resin.

2. The aqueous alkyd resin according to claim 1, wherein the α,β-unsaturated dicarboxylic acid or the anhydride thereof is a member selected from the group consisting of maleic anhydride, maleic acid, fumaric acid, itaconic acid and citraconic acid.

3. The aqueous akyd resin according to claim 1, wherein the aromatic polycarboyxlic acid or the anhydride thereof is a member selected from the group consisting of phthalic anhydride, phthalic acid, isophthalic acid, trimellitic acid, trimellitic anhydride and pyromellitic anhydride.

4. The aqueous alkyd resin according to claim 1, wherein the polyhydric alcohol is a member selected from the group consisting of glycerin, pentaerythritol, trimethylol propane, trimethylol ethane, ethylene glycol and diethylene glycol.

5. The aqueous akyd resin according to claim 1, wherein the natural fat and oil or fatty acid is a member selected from the group consisting of linseed oil, soybean oil, tung oil, dehydrated castor oil, safflower oil, coconut oil, and a fatty acid derived therefrom.

6. The aqueous alkyd resin according to claim 1, wherein the polycondensation resin has free carboxyl groups in the amount corresponding to an acid value of 30 to 60.

7. The aqueous alkyd resin according to claim 1, wherein the neutralizing agent is a member selected from the group consisting of methylamine, ethylamine, monoethanolamine, cyclohexylamine, dimethylamine, diethylamine, morpholine, diethanolamine, trimethylamine, triethylamine, N-alkylmorpholine, triethanolamine, sodium hydroxide, potassium hydroxide and ammonia.

8. The aqueous alkyd resin according to claim 1, wherein the amount of the component (b) is in the range of 5 to 50% by weight on the basis of the whole resin.

9. A method for preparing an aqueous alkyd resin, which comprises polycondensing a reaction mixture obtained by the transesterification or esterification of (a) a natural fat and oil or a fatty acid with a polyhydric alcohol with an adduct of (b) a liquid polybutadiene having a number average molecular weight of 150 to 900, a viscosity of 2 to 80 cps. at 30° C and at least 50% of the cis-1,4 structure with an α,β-unsaturated dicarboxylic acid or the anhydride thereof, and/or the half-ester of said adduct, and (c) an aromatic polycarboxylic acid or the anhydride thereof, to give a polycondensation resin having free carboxyl groups in the amount corresponding to an acid value of 30 to 70 and containing 5 to 50% by weight of the component (b), and neutralizing the polycondensation resin with a neutralizing agent.

10. The method according to claim 9, wherein the proportion of the component (b) to the component (a) is in the range of 0.1 to 0.7 by weight.

11. The method according to claim 9, wherein the neutralizing agent is used in an amount of 0.3 to 1.2 equivalent to the carboxyl groups contained in the polycondensation resin.

12. A water-base paint containing the aqueous resin as set forth in claim 1.

13. A baking paint comprising the aqueous alkyd resin as set forth in claim 1 and a melamine resin.

14. The baking paint according to claim 13, wherein the melamine resin is present in the range of 10 to 50% by weight.

* * * * *